US010871129B1

(12) United States Patent
Jentz et al.

(10) Patent No.: US 10,871,129 B1
(45) Date of Patent: Dec. 22, 2020

(54) CRANKCASE VENTILATION SYSTEM AND DIAGNOSTIC METHOD

(71) Applicant: Ford Global Technologies, LLC, Dearborn, MI (US)

(72) Inventors: Robert Roy Jentz, Westland, MI (US); Matthew Carpenter, Northville, MI (US); Michael Stephen Sweppy, Manchester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/450,886

(22) Filed: Jun. 24, 2019

(51) Int. Cl.
*F02M 25/06* (2016.01)
*F01M 1/20* (2006.01)
*F01M 13/04* (2006.01)
*G01M 3/02* (2006.01)
*F01M 1/10* (2006.01)
*F01M 13/00* (2006.01)

(52) U.S. Cl.
CPC ............. *F02M 25/06* (2013.01); *F01M 1/10* (2013.01); *F01M 1/20* (2013.01); *F01M 13/00* (2013.01); *F01M 13/0011* (2013.01); *F01M 13/04* (2013.01); *G01M 3/025* (2013.01)

(58) Field of Classification Search
CPC ............ F01M 1/10; F01M 1/20; F01M 13/04; F01M 13/00; F01M 13/0011; G01M 3/025; F02M 25/06
USPC .................................. 701/101; 123/572–574
See application file for complete search history.

(56) References Cited

U.S. PATENT DOCUMENTS

| 5,792,949 A * | 8/1998 | Hewelt ................. G01M 3/025 123/41.86 |
| 2001/0047801 A1* | 12/2001 | Baeuerle ................ F02M 25/06 123/574 |
| 2005/0022795 A1* | 2/2005 | Beyer .................... F01M 11/10 123/516 |
| 2014/0081549 A1* | 3/2014 | Rollinger ............... F02N 11/10 701/101 |
| 2014/0081550 A1 | 3/2014 | Jentz et al. |
| 2014/0081551 A1* | 3/2014 | Rollinger ............. F01M 13/023 701/101 |
| 2014/0081564 A1* | 3/2014 | Pursifull ................ F01M 11/10 701/113 |
| 2018/0075713 A1* | 3/2018 | Henson ............... F02D 41/0007 |
| 2019/0226368 A1* | 7/2019 | Hofmann ............... F01M 13/00 |

OTHER PUBLICATIONS

Jentz, R. et al., "Crankcase Ventilation System and Diagnostic Method," U.S. Appl. No. 16/450,861, filed Jun. 24, 2019, 53 pages.

* cited by examiner

*Primary Examiner* — Mahmoud Gimie
(74) *Attorney, Agent, or Firm* — Geoffrey Brumbaugh; McCoy Russell LLP

(57) ABSTRACT

Methods and systems are provided for diagnosing a positive crankcase ventilation (PCV) system. In one example, a PCV system diagnostic method is provided that includes a determining a fault condition in a positive crankcase ventilation (PCV) system by comparing a pressure sampled from a pressure sensor positioned on a clean side of an oil separator coupled to a crankcase with a modeled pressure representing an expected pressure on the clean side of the oil separator.

20 Claims, 9 Drawing Sheets

CRANKCASE VENTILATION SYSTEM AND DIAGNOSTIC METHOD

BACKGROUND/SUMMARY

Engines may include crankcase ventilation systems to vent gases out of the crankcase and into an engine intake manifold to evacuate gases from inside the crankcase in order to reduce degradation of various engine components in the crankcase. The crankcase ventilation systems may include a positive crankcase ventilation (PCV) valve for enabling one-way flow of crankcase gases from inside the crankcase to the intake manifold.

Crankcase ventilation systems are intermittently diagnosed for PCV valve degradation. One example approach for PCV valve diagnostics is shown by Rollinger in US 2014/0081549. Therein, PCV system diagnostics are implemented using a pressure sensor coupled to a hose extending between an intake conduit upstream of a compressor and an oil separator in the crankcase. A pressure drop indicated by the pressure sensor during unboosted conditions is used to ascertain a PCV system breach. It will also be understood that traditional PCV systems are disabled during boosted conditions in engines with turbochargers, superchargers, etc., due to the positive pressure present in the intake manifold.

The inventors herein have recognized potential issues with such approaches. As one example, no diagnostic method is provided during boosted conditions in Rollinger's system. As such, the PCV system may only be diagnosed during a limited window of engine operation. This problem is exacerbated in boosted engines with a low power to weight ratio, where boosting occurs over a wide range of engine operating conditions. Furthermore, in Rollinger the PCV system is not designed to vent crankcase gasses during boosted conditions. As such, the crankcase may experience elevated pressures and degradation due to oil dilution, seal leaks, and other problems associated with crankcase gas contamination caused by blow-by gasses. More generally, some PCV systems have suffered from unreliable diagnostic routines which may lead to false positives.

In one approach, to at least partially address these issues, a diagnostic method in a PCV system is provided. The method includes determining a fault condition in the PCV system by comparing a pressure sampled from a pressure sensor positioned on a clean side of an oil separator coupled to a crankcase with a modeled pressure representing an expected pressure on the clean side of the oil separator. In this way, the confidence in the PCV system diagnostic routine can be increased by modeling an expected pressure in the system.

In one example, determining the fault condition includes determining if the comparison between the sampled pressure and the modeled pressure is outside a dynamic tolerance band. In this way, the likelihood of a false diagnosis of a fault condition in the PCV system is reduced by taking into account modeling uncertainties in the diagnostic routine.

In another example, the modeled pressure may be determined based on a cylinder blow-by value and an airflow through a PCV valve into the crankcase from an intake manifold. Modeling the pressure in this way, further increases confidence in the diagnostic method.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are drawn to scale. However, other relative dimensions may be used in other embodiments.

DETAILED DESCRIPTION

The following description relates to systems and methods for monitoring crankcase ventilation system integrity. For example, a diagnostic method, in one example, is carried out in a positive crankcase ventilation (PCV) system including a pressure sensor located on a clean side of an oil separator coupled to a crankcase housing. The diagnostic method may include monitoring the sensor while, for example, the engine is boosted via a compressor and a PCV valve is metering flow to the crankcase. However, sampling windows occurring outside boosted conditions have been contemplated. The monitored pressure may be compared against a fault threshold to determine if a PCV system breach (e.g., leaking or detached ventilation line) has occurred. The fault threshold may be calculated using variables such as barometric pressure, ambient temperature, crankcase pressure, air intake system (AIS) pressure, combinations thereof, etc. Specifically, in one example, the fault threshold may be determined based on a modeled value of a pressure on the clean side of the oil separator. Inputs into the model may include airflow through the PCV valve, airflow through the intake system, cylinder blow-by, etc. In this way, a PCV system fault may be confidently diagnosed, during engine boost for instance, resulting in the expansion of the window for PCV system diagnostics. Consequently, engines may more often and confidently identify a crankcase ventilation system breach. The expansion of the leak testing during boosted conditions is particularly beneficial in engines boosted for significant amounts of time, such as low power to weight ratio engines. The method may look at conditions when the PCV system is expected to be faulted, such as when the fresh air hose, referred to herein as a ventilation line, is breached or disconnected. Looking specifically for faulted conditions allows for an accurate diagnosis of ventilation line breach (e.g., line leaks or disconnection).

Figure 1:
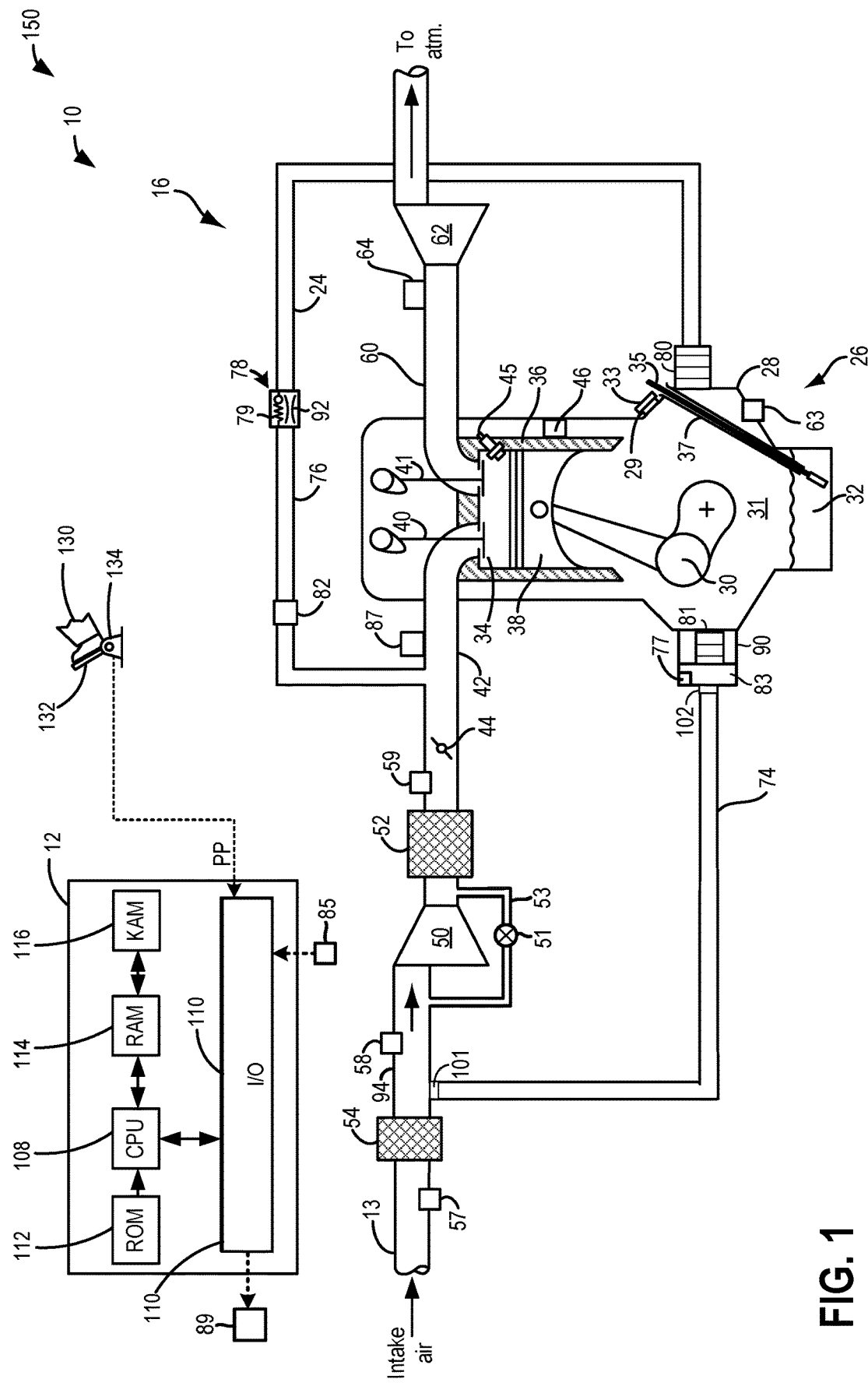
FIG. 1 shows a partial engine view of a positive crankcase ventilation (PCV) system in accordance with the disclosure.
Figure 2:
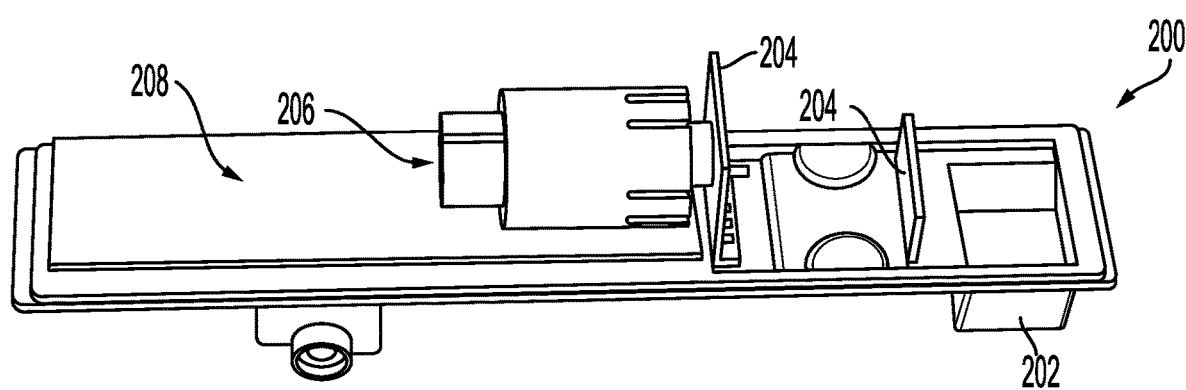
FIG. 2 shows an example of an oil separator in the PCV system, shown in FIG. 1.
Figure 3:
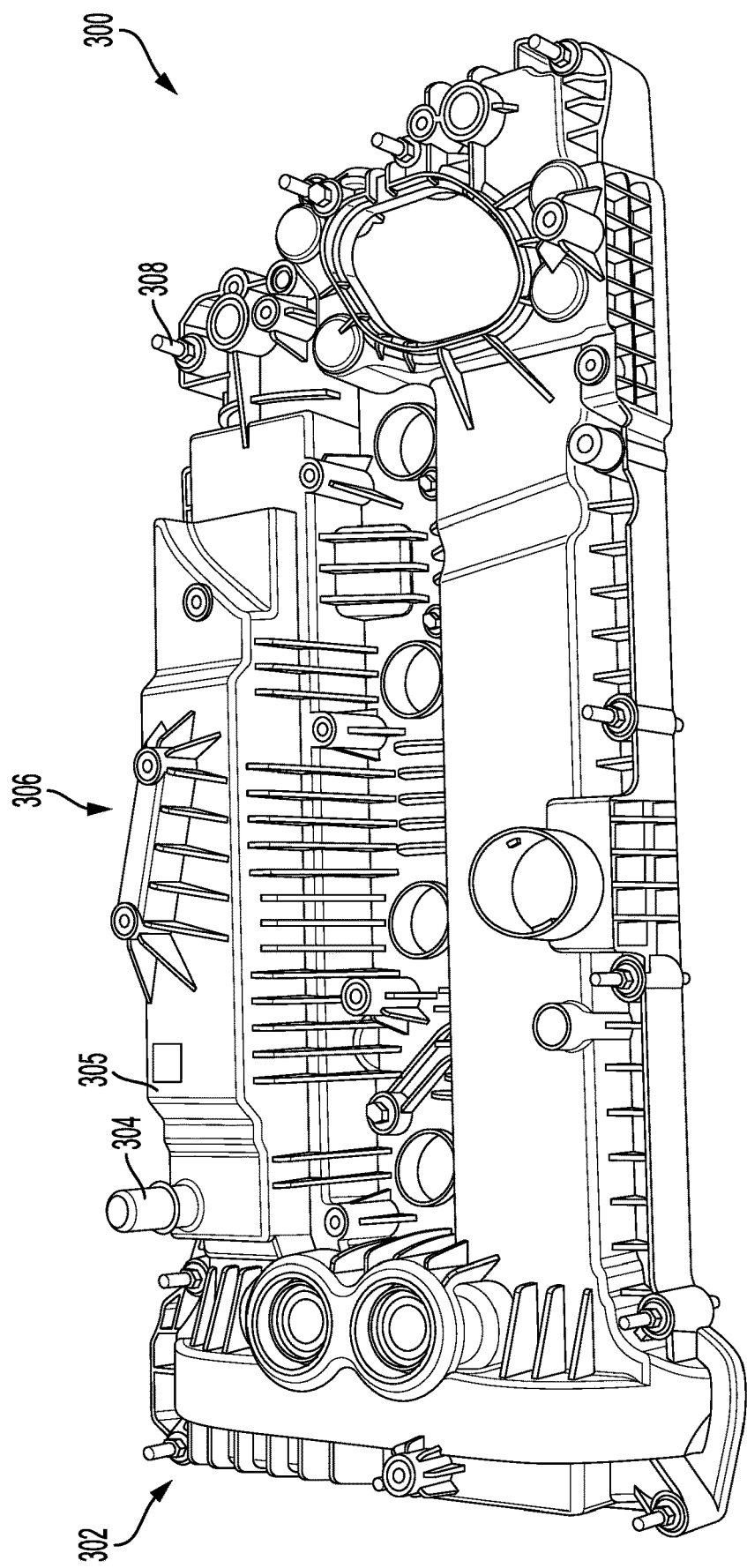
FIG. 3 shows an example of a cam cover in the PCV system, shown in FIG. 1.

FIG. 1 shows a schematic illustration of an engine including a PCV system designed to implement crankcase ventilation during boosted and unboosted conditions. FIG. 2 shows a detailed view of an example of an oil separator. FIG. 3 shows a detailed view of an example of a cam cover. FIG.

Figure 5:
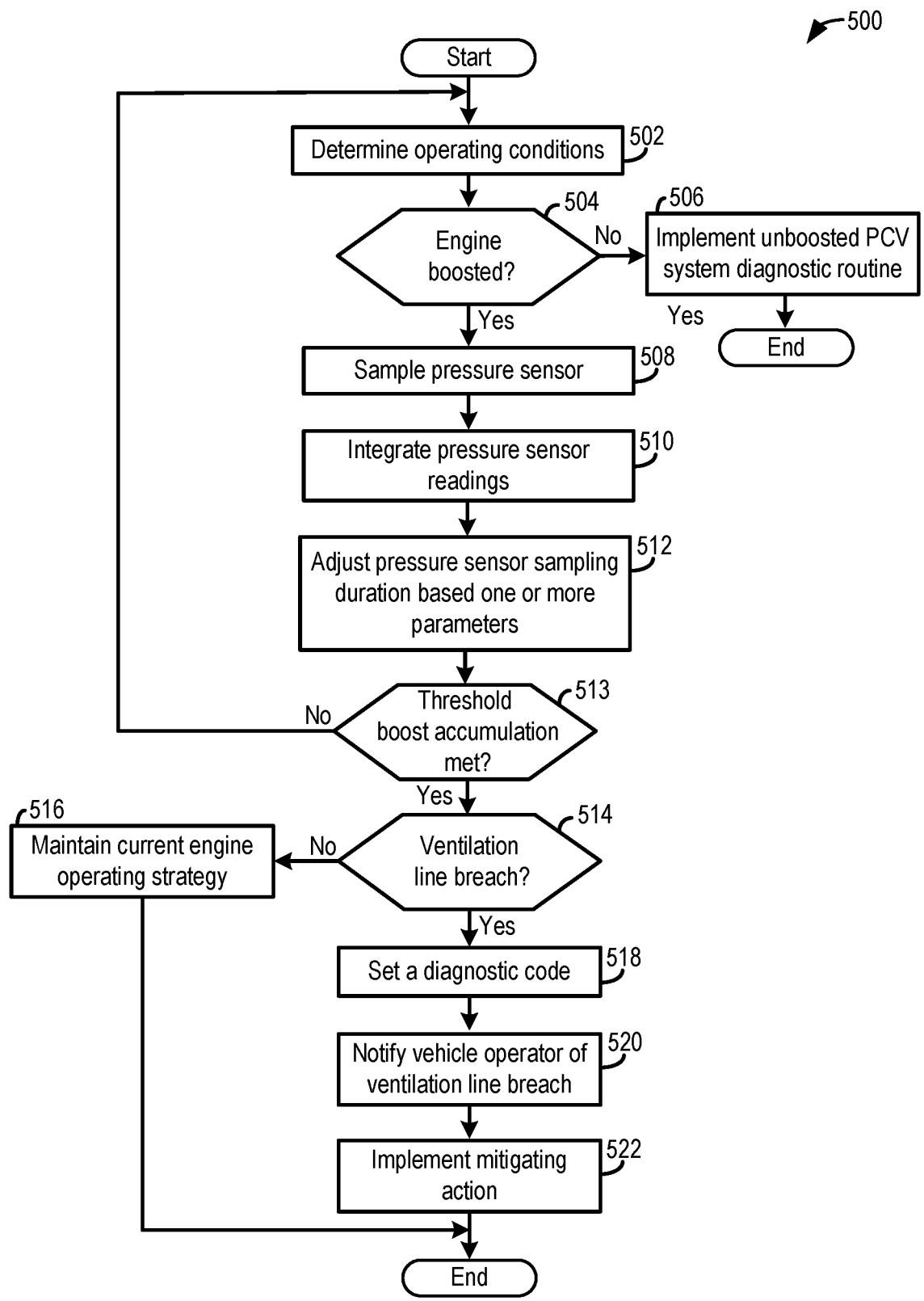
FIG. 5 shows a detailed flow chart for diagnosing a PCV system.
Figure 6:
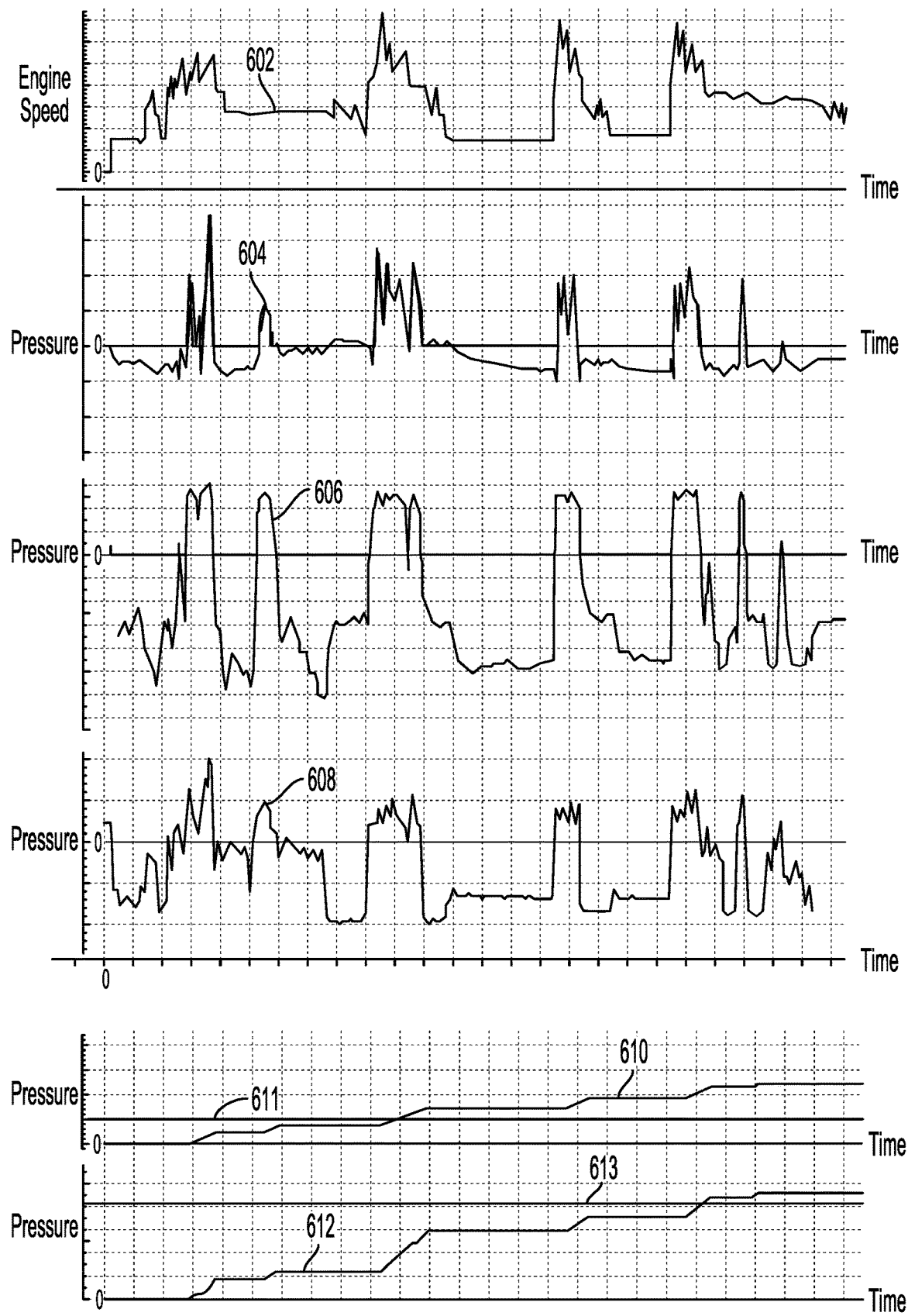
FIGS. 6 and 7 show maps corresponding to different examples of PCV system diagnostic techniques.
Figure 7:
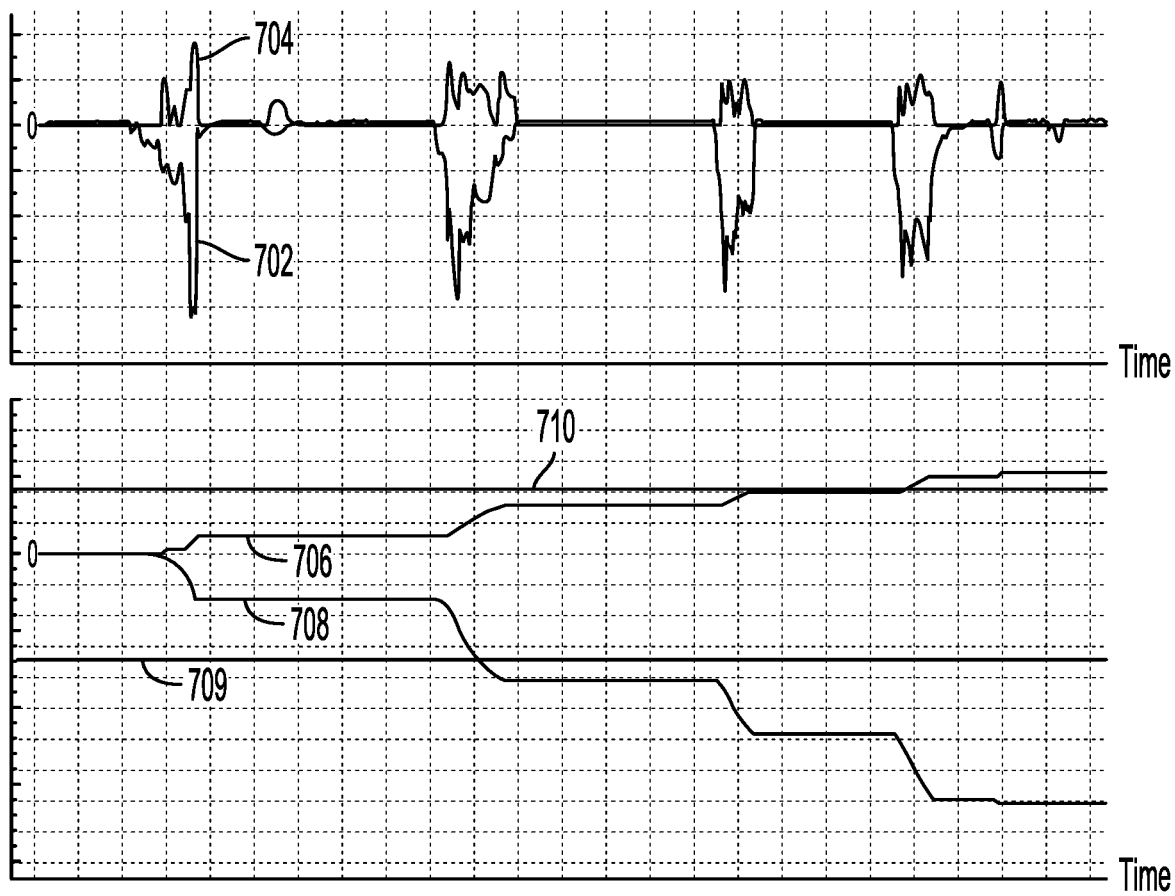
Figure 8:
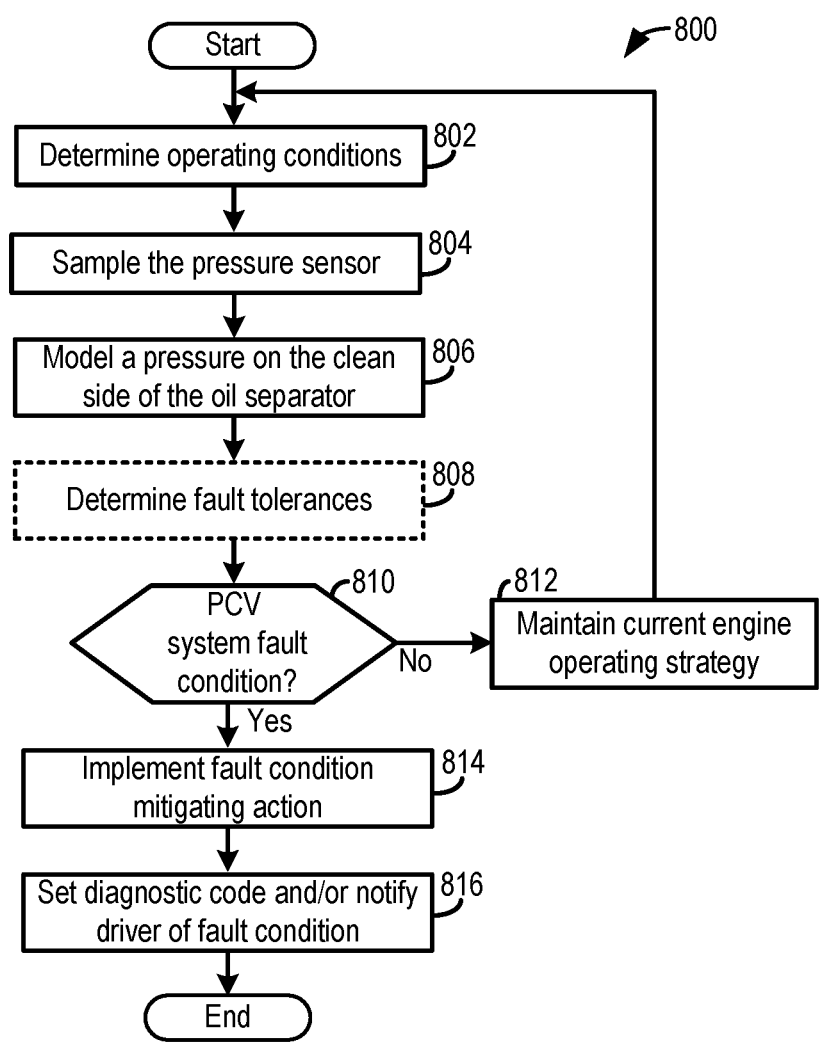
FIG. 8 shows another flow chart for diagnosing a PCV system.
Figure 9:
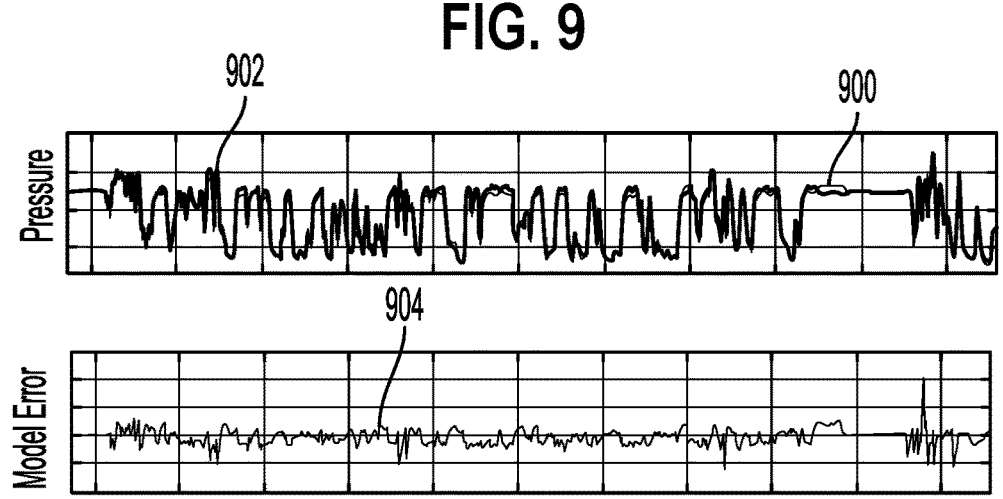
FIGS. 9 and 10 show maps corresponding to the PCV diagnostic technique, illustrated in FIG. 8.
Figure 10:
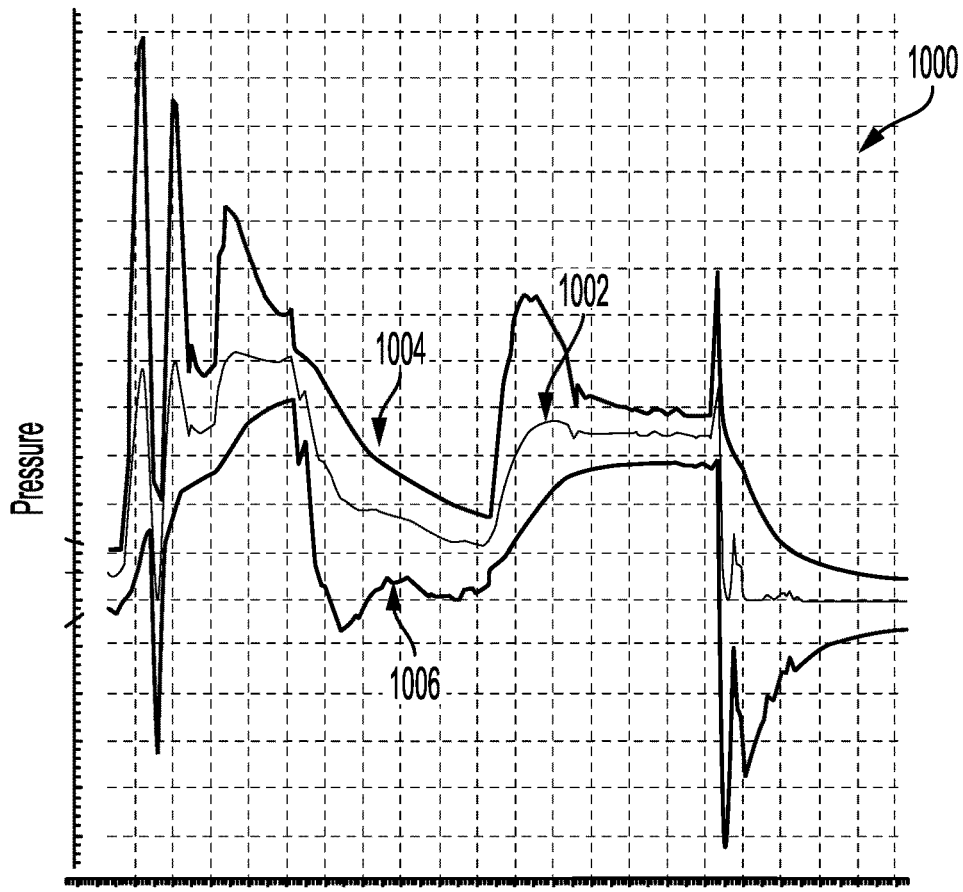

4 shows a high-level method for diagnosing a breach in a PCV system. FIG. 5 shows a more detailed method for diagnosing a breach in a PCV system. FIGS. 6 and 7 show maps corresponding to different examples of PCV system diagnostic techniques. FIG. 8 shows another diagnostic method for a PCV system. FIGS. 9 and 10 show graphs related to the diagnostic technique depicted in FIG. 8.

Referring now to FIG. 1, it shows an example system configuration of a multi-cylinder internal combustion engine, generally depicted at 10, which may be included in a propulsion system of an automotive vehicle 150. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. The crankcase 28 includes an interior chamber 31 in which the crankshaft 30 and other components (e.g., piston rod, etc.,) are positioned.

An oil fill port 29 may be disposed in crankcase 28 so that oil may be supplied to oil well 32. Oil fill port 29 may include an oil cap 33 to seal oil port 29 when the engine is in operation. A dipstick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein). Port fuel injection may, additionally or alternatively, be implemented in the engine 10.

A throttle 44 may be disposed in the engine intake to control the airflow entering intake manifold 42 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated. The compressor 50 is designed to increase the pressure of intake air (i.e., generate boost). Rotors, vanes, housing, etc., may be included in the compressor to carry out boosting operation. A compressor bypass valve 51 is positioned in a compressor bypass conduit 53 bypassing the compressor 50. The compressor bypass valve 51 regulates the amount of gas flow around the compressor 50 to augment boost generated by the compressor. Specifically, the compressor bypass conduit 53 is coupled to the intake system at an intake conduit downstream of the air cleaner 54 and upstream of the compressor at one end, and downstream of the compressor and upstream of the charge air cooler 52 at the other end. However, other compressor bypass conduit arrangements have been envisioned.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected to controller 12.

In the example of FIG. 1, a PCV system 16 is coupled to the engine intake so that gases in the crankcase may be vented in a controlled manner from the crankcase. During unboosted conditions (when manifold pressure (MAP) is less than barometric pressure (BP)), the crankcase ventilation system 16 draws air into crankcase 28 via a ventilation line 74. In such, an example, the ventilation line 74 acts as a breather vent tube. A first side 101 of ventilation line 74 is mechanically coupled, or connected, to fresh air intake passage 13 upstream of compressor 50 and downstream of air cleaner 54. In other examples, the first side 101 of ventilation line 74 may be coupled to intake passage 13 upstream of air cleaner 54 and compressor 50. A second, opposite side 102 of ventilation line 74 is mechanically coupled, or connected, to crankcase 28 via an oil separator 81. Coupling mechanism such as quick coupling, hose clamps, etc., may be used to secure the ends of the ventilation line 74 to the corresponding components. The oil separator 81 is coupled to a housing 29 of the crankcase 28. In the illustrated example, the oil separator 81 is positioned at an interior side of the housing 29. However, in other examples, the oil separator 81 may be positioned on an exterior side of the housing 29 or may act as a section of the housing. The oil separator 81 is designed to remove oil from gas flowing therethrough and may include walls, chambers, filters, combinations thereof, etc., to accomplish said oil separation. It will therefore be appreciated that the oil separator 81 includes a clean side downstream of the oil separation mechanism and a dirty side upstream of the oil separation mechanism.

The gases in crankcase 28 may consist of un-burned fuel, un-combusted air, and fully or partially combusted gases. Further, lubricant mist may also be present. As such, various oil separators may be incorporated in crankcase ventilation system 16 to reduce an amount of oil mist exiting the crankcase through the PCV system. The oil separator 81 is designed to remove the contaminants (e.g., oil, combustion byproducts, etc.,) from the crankcase gas flowing there through. The oil separator 81 is a bi-directional separator allowing gases to flow through the separator and into vent line 74 as well as into the crankcase 28. However, in other examples, the oil separator 81 may be unidirectional. The PCV system 16 includes a second oil separator 80 that filters oil from vapors exiting crankcase 28 before they re-enter the intake manifold 42 during unboosted conditions. The oil separators may include walls, chamber, housing, filters, combinations thereof, etc., to accomplish the oil removal functionality. In one example, the oil separators 80 and 81 may have a similar construction. However, in other examples the construction of the separators may vary. Additionally, PCV line 76 may also include a vacuum sensor 82 coupled to the PCV system. Additionally or alternatively, a MAP or manifold vacuum (ManVac) sensor 87 may be located in intake manifold 42.

The oil separator 81 may be included in a cam cover 90. The cam cover 90 may at least partially enclose a camshaft with cams actuating the intake and/or exhaust valves. The oil separator 81 includes a housing chamber 83. The housing chamber 83 is on a clean side of the oil separator 81 and therefore is fluidly separated the crankcase chamber 31. The oil separator 81 includes one or more conduits, filters, etc., designed to capture oil or other contaminants in the crankcase gasses, to reduce the amount of gas contamination in the ventilation line 74, as previously discussed. It will be understood that the oil separator 80 may also be included in a cam cover, in some embodiments.

A pressure sensor 77, in the PCV system 16, is also shown coupled to the crankcase chamber 31 and the ventilation line 74. In one particular example, the pressure sensor 77 is positioned on the clean side of the oil separator 81 in the housing chamber 83. Specifically, in one instance, the pressure sensor 77 is located on a clean side of the oil separator 81 positioned on an interior side of the crankcase housing 29. However, in other examples, as previously discussed, the separator may be coupled to an external side of the crankcase housing. Other sensor locations external to the crankcase and vent line have been envisioned. It will be understood, that the pressure sensor 77 may be positioned external to the ventilation line 74 (e.g., spaced away from side 102 of the vent line) to allow the sensor to sample pressure in the PCV system used for diagnostics when the vent line is disconnected. In particular, the inventors herein have recognized that by positioning the pressure sensor 77 in a location on the clean side of the oil separator 81 and external to the ventilation line 74, the PCV system can be more confidently diagnosed when compared to previous systems positioning the sensor in the ventilation line. Furthermore, positioning the pressure sensor 77 on the clean side of the oil separator 81, reduces the likelihood of sensor fouling, thereby increasing confidence in the output of the sensor. Specifically, the sensor is protected from oil, combustion byproducts, etc., in the crankcase when it is positioned on the side of the oil separator external to the crankcase.

One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In some embodiments, a pressure sensor (not shown) may be coupled in intake passage 13 downstream of air filter 54 and upstream of compressor 50 to provide an estimate of the compressor inlet pressure (CIP). Further still, a pressure sensor 59 may be coupled downstream of compressor 50 for providing an estimate of a throttle inlet pressure (TIP). Any of the above-mentioned pressure sensors may be absolute pressure sensor or gauge sensors. Additionally, the pressure sensor 87 may be positioned in the intake manifold 42 to provide a manifold pressure. A pressure sensor 63 may also be included in the crankcase 28. However, in other examples, the crankcase pressure may be inferred from other sensor signals. Additionally, an ambient sensor 85 is also shown included in the PCV system 16. The ambient sensor 85 may be a temperature and/or a pressure sensor for measuring ambient temperature and/or pressure. However, in other examples, the ambient sensor 85 may be omitted from the PCV system.

PCV system 16 also vents gases out of the crankcase and into intake manifold 42 via a conduit 76 (herein also referred to as PCV line 76). In some examples, PCV line 76 may include a PCV valve 78. The PCV valve 78 may be a passive valve. Specifically, in the illustrated example, the PCV valve 78 includes a check valve 79 in a parallel flow arrangement with a metering orifice 92. The metering orifice 92 functions as a flow restrictor. For example, the metering orifice 92 may operate as a chocked flow point when gas flows through the PCV line 76 to the crankcase 28 (i.e., during boosted conditions). In such an example, the check valve 79 is closed to restrict gas flow through the PCV line 76. To elaborate, check valve 79 may be designed to close when the pressure in the intake manifold is greater than the crankcase. Conversely, the check valve 79 may be designed open when the pressure in the intake manifold is less than the crankcase, such as when the engine is operating under unboosted conditions. The check valve 79 may include a spring, valve head, etc., to achieve the opening/closing functionality. Still further, in other examples, the PCV valve 78 may be actively controlled via signals from the controller 12. It will be understood that when ventilation line 74 is breached or disconnected and the intake manifold is at a positive pressure the check valve 79 in the PCV valve 78 will be pushed closed. When the check valve is closed, gas travels through the valve towards the intake manifold at a restricted flow, dictated by the profile of the metering orifice 92. The amount of restriction in the metering orifice 92 may be ascertained based on desired crankcase ventilation during boosted conditions, boost pressure range, expected gas blow-by from the cylinders and/or turbine shaft, etc.

It will be understood that the PCV system 16 may be operated in a boosted flow mode and an unboosted flow mode. In each mode, crankcase gasses are flowed (e.g., purged) from the crankcase into the intake system. In the boosted flow mode, the compressor generates boost (i.e., compressed intake air) in the intake manifold 42. Thus, the intake manifold 42 has a positive pressure during boosted conditions. Specifically, in one example, a threshold manifold pressure (e.g., atmospheric pressure) may be used as a boosted condition indicator. Specifically in one example, boosted conditions may be determined when the intake manifold is at positive pressure when compared to barometric pressure. In particular, when the calculation MAP-BP is positive, it may be indicated that a boosted condition is occurring. In other examples, turbo/compressor speed and the state of the compressor bypass valve (CBV) position and/or turbine wastegate position may be used to delineate when boosted conditions occur. For example, if the turbocharger system is dumping boost via one or more of the valves it may be ascertained the engine is operating under a boosted condition. However, other metrics indicating a boosted condition have been envisioned. It will be understood that when the engine is boosted, gas will flow through PCV line 76 from the intake manifold 42 to the crankcase 28. Additionally, when the engine is boosted crankcase gas travels through the ventilation line 74 from the crankcase 28 to the intake conduit 94.

On the other hand, during the unboosted mode, gas flows from the intake conduit 94 into the ventilation line 74 and then to the crankcase 28. From the crankcase 28 gas flows to the PCV line 76 and then to the intake manifold 42. It will be understood that the engine 10 may be transitioned between the boosted and unboosted modes based on operating conditions, such as requested engine output, engine load, engine temperature, etc. The compressor bypass valve, the wastegate, etc., may be operated to transition between the boosted (compressor in operation) and unboosted (compressor operation is substantially shut-down) conditions.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58, engine coolant temperature (ECT) from temperature sensor 46, PCV pressure from vacuum sensor 82, exhaust gas air/fuel ratio from exhaust gas sensor 64, pressure sensor 77, BP sensor 57, CIP sensor 58, TIP sensor 59, pressure sensor 87, ambient sensor 85, pressure sensor 65, etc. Furthermore, controller 12 may monitor and adjust the position of various actuators based on input received from the various sensors. These actuators may be include in, for example, throttle 44, intake and exhaust valve systems 40, 41, compressor bypass valve 51, etc. When the PCV valve 78 is an active control valve, the valve may also include an actuator. Storage medium read-only memory 112 can be programmed with computer readable data representing instructions executable by processor 108 for performing the methods described below, as well as other variants that are anticipated but not specifically listed. Example methods and routines are described herein with reference to FIGS. 4-5 and FIG. 8. It will be understood that actuators in the aforementioned components may be adjusted via signals from the controller 12. It will also be understood that the controller 12 may determine control signals to send to the aforementioned components based on inputs such as signals from sensors, programmatic controls, etc. In another example, the controller may include lookup tables indexed to engine operating conditions for component adjustment. For example, one table may correspond to fuel injection during compressor operation and one table may correspond to fuel injection during unboosted conditions. However, numerous control schemes are possible.

In one example the controller may include instructions stored in memory 112 that when executed by the processor cause the controller to, while the PCV system is operated with a boosted engine condition, for example, where the intake manifold air pressure is above a threshold value and where the PCV valve 78 meters gas flow to the crankcase 28, determine a PCV system breach based on a pressure from the pressure sensor 77. For example, the pressure may be compared against a fault threshold that may be a function of barometric pressure and ambient temperature. However, other factors may be used to determine the fault threshold, in other examples. For example, the fault threshold may be calculated using the technique for modeling pressure on the clean side of the oil separator, discussed in greater detail herein. In this way, the system may be diagnosed during compressor operation to expand the range over which the breach diagnostic can be performed. As a result, the chance of an undiagnosed system breach is decreased. Further in one example, the controller may further include instructions stored in memory that when executed by the processor cause the controller to implement a mitigating action in response to determining the PCV system breach. The mitigating action may include adjusting boost generated by the compressor, adjusting fuel injection, adjusting throttle control, etc. For instance, the boost generated by the compressor may be decreased by opening the compressor bypass valve or increasing the amount of opening of compressor bypass valve and/or wastegate. Additionally or alternatively, fuel injection metering may be decreased. In this way, overpressure crankcase conditions may be avoided. In one example, the mitigating action may include discontinuing boosted engine operation. Furthermore, it will be appreciated that a diagnostic code may be set and/or a vehicle operator may be notified via an alert (e.g., visual, audio, and/or haptic alert) generated by an alert device 89 (e.g., speaker, light, graphical interface, haptic device, etc.,) when the PCV system breach is determined. The alert device 89 may be included in the vehicle cabin (e.g., on the dash) or elsewhere in the vehicle. Further in one example, the controller 12 may include instructions for sampling the pressure sensor 77 during a selected time period including multiple boost events and/or drive cycles. In this way, the pressure sensor sampling may occur for time period deemed to provide a confident PCV system diagnosis. For instance, the PCV system diagnostics may be implemented when a desired pressure sampling time period has been surpassed. A boost event is an event where the compressor is operated to increase pressure of in the intake manifold. A drive cycle is a time interval bounded by engine start and engine stop. For instance, a drive cycle may include an event where the engine is started-up the vehicle is driven along a path and the engine is then shut-down.

FIG. 2 shows a detailed view of an oil separator 200. The oil separator 200 includes an outlet conduit 202, walls 204, and a filter unit 206. The oil separator 200 is designed to remove oil and other contaminants from gasses flowing there through, as previously discussed. A clean side 208 (e.g., chamber with less contaminants than the crankcase due to the filtration functionality of the oil separator) of the oil separator 200 is also shown in FIG. 2. In FIG. 2, the clean side 208 creates a cavity that is open to the cam cover port 304 in FIG. 3. It will be understood, that the oil separator 200 may be integrated into a cam cover in an engine.

FIG. 3 shows an example of the cam cover 90, depicted in FIG. 1. As such, the cam cover 300 may include the features, functionality, etc., of the cover shown in FIG. 1 or vice versa. The cam cover 300 includes a housing 302 with a PCV ventilation line (e.g., hose) port 304 extending there through. A pressure sensor may extend through a section 305 of the housing 302 into the clean side 208 of the oil separator 200, shown in FIG. 2. Specifically, in one example, the sensor may extend through an upper section of the housing 302 due to packaging constraints. However, numerous sensor locations have been envisioned. For instance, in another example, a pressure sensor, such as the pressure sensor 77, may be located adjacent to the PCV ventilation line port 304. Positioning the sensor on the clean side of the oil separator in the cam cover allows the sensor to be placed in a protected location less susceptible to degradation than the ventilation line, for example. Consequently, the confidence in the sensor reading may be increased and the sensor can be used to determine when the ventilation line is leaking (e.g., line puncture, line disconnect, etc.) The cam cover 300 includes a section 306 enclosing an oil separator, such as the oil separator 200, shown in FIG. 2. By integrating the oil separator into the cam cover the compactness of the PCV system is increased. Mounting hardware 308 for connecting the cam cover to the engine, is also illustrated in FIG. 3.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
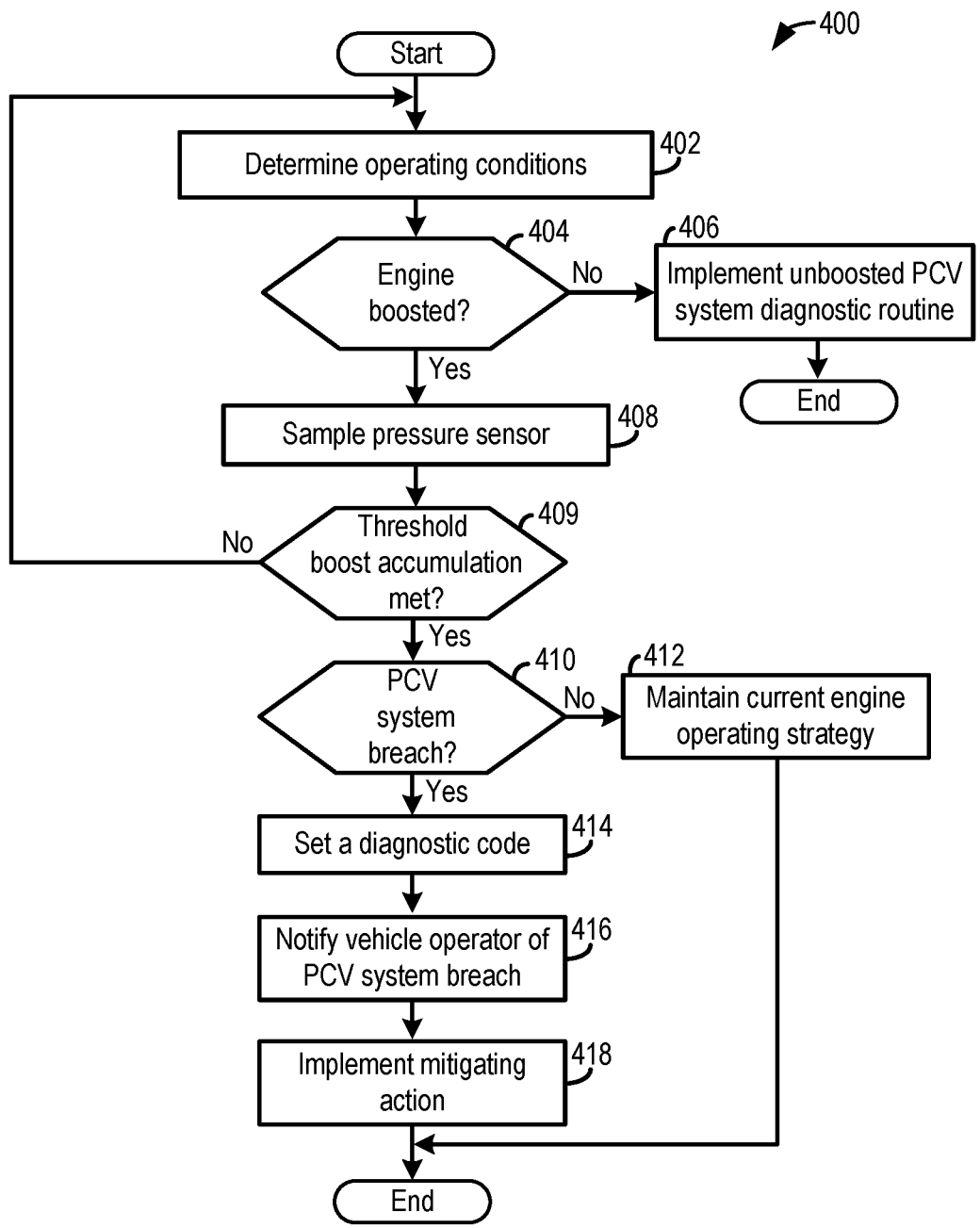
FIG. 4 shows a high-level flow chart for diagnosing a PCV system.

FIG. 4 shows a diagnostic method 400 for a PCV system. The method 400 may be implemented via the engine, systems, components, etc., described above with regard to FIGS. 1-3. However, in other examples, the method may be implemented via other suitable engines, systems, components, etc. Instructions for carrying out method 400 and the rest of the methods described herein may be executed by a controller (e.g., controller processor) based on instructions stored on non-transitory memory of the controller and in conjunction with signals received from sensors of the engine system, such as the sensors described above with reference to FIG. 1. The controller may employ engine actuators of the engine system to adjust engine operation, according to the methods described below.

At 402, the method includes determining operating conditions, such as engine speed, pressure from the pressure sensor 77, shown in FIG. 1, crankcase pressure, manifold pressure, ambient temperature, barometric pressure, intake system pressure upstream of the compressor, etc. In one example, the crankcase pressure, manifold pressure, and/or intake system pressure upstream of the compressor may be modeled using inputs from other sensors. However, in another example, the crankcase pressure, manifold pressure, and/or intake system pressure upstream of the compressor may be determined using inputs from sensors located in the crankcase, intake manifold, and/or an intake conduit upstream of the compressor.

Next at 404, the method includes determining if the engine is operating under a boosted condition. A threshold manifold pressure may be used to make said determination. For example, if the engine is above a threshold manifold pressure (e.g., barometric pressure) the engine is boosted and if the engine is operating below the threshold manifold pressure the engine is unboosted. However, compressor bypass valve position, wastegate valve position, etc., may additionally or alternatively be used to ascertain if the engine is operating under a boosted condition. In one example, step 404 may determine that a boosted condition is occurring while an unboosted condition is not occurring. Thus, the boosted condition and unboosted condition are mutually exclusive. It will be understood that a boosted operating mode may be implemented during a first set of conditions while an unboosted operating mode may be implemented during a second set of conditions, different from the first set of conditions.

If the engine is not operating under a boosted condition (NO at 404) the method proceeds to 406, where the method includes implementing an unboosted PCV diagnostic routine. Specifically, in one example, the diagnostic routine implemented at 406 may be used to ascertain a leak (e.g., puncture, disconnection, etc.,) of a PCV hose extending between the crankcase and the intake manifold. In such an example, vacuum draw during engine crank, run-up, and/or idle may be used as an input for the diagnostic routine. However, numerous unboosted diagnostic strategies are possible.

On the other hand, if it is determined that the engine is operating under a boosted condition (YES at 404) the method advances to 408. At 408, the method includes sampling a pressure sensor (e.g., pressure sensor 77, shown in FIG. 1) on a clean side of the oil separator but external to the ventilation line. In one example, a length of the sampling of the pressure sensor may be varied based on barometric pressure, ambient temperature, an expected air intake system (AIS) pressure upstream of the compressor (e.g., expected AIS pressure), crankcase pressure (e.g., inferred crankcase pressure), manifold pressure (e.g., inferred manifold pressure), etc. For instance, the length of the sampling may follow the length of the boosted condition and continue to sample each time the boosted condition repeats until a total minimum amount of boost condition is met.

At 409 the method includes determining if a threshold boost accumulation has been met. For instance, is may be determined if a boost pressure in the intake manifold has remained above a threshold value for a threshold time period. Furthermore, it will be understood that the pressure samples taken during boosted conditions may be gathered over multiple boost events and/or drive cycles, in some instances. If it is determined that the threshold boost accumulation has not been met (NO at 409) the method returns to 402. However, if it is determined that the threshold boost accumulation has been met (YES at 409) the method advances to 410.

At 410, the method includes determining if a PCV system breach has occurred. Specifically, in one example, it may be ascertained if a leak or disconnection has occurred in the ventilation line extending between the crankcase and an intake system location upstream of the compressor. In this way, a more granular PCV system diagnosis may be achieved. In one example, the determination may specifically look for a breach fault condition. The breach fault condition may include a condition where the pressure sensor 77 experiences a pressure increase due to an increase in crankcase flow due to the PCV valve operating at a chocked flow. When the PCV valve is operated at its chocked flow the crankcase may be protected from overpressure conditions arising from boosted manifold pressures, reducing the likelihood of hardware degradation in the crankcase. The determination may also use a threshold fault value that may be a function of boost pressure and/or ambient temperature, for example.

If it is determined that a PCV system breach has not occurred (NO at 410) the method proceeds to 412 where the method includes maintaining the current engine operating strategy. For instance, engine boost, fuel injection, and/or throttle control may be carried out based on torque demand, engine load, etc.

On the other hand, if it is determined that a PCV system breach has occurred (YES at 410) the method advances to 414 where the method includes setting a diagnostic code. At 416 the method include alerting a vehicle operator of a PCV system breach and at 418 the method includes implementing a mitigating action. However, in other examples, step 414, 416, and/or step 418 may be omitted from the diagnostic control scheme. The mitigating action may include adjusting boost generated by the compressor. For instance, boost may be decreased or the engine may be transitioned from a boosted mode of operation to an unboosted mode of operation. Throttle and/or fuel injection control may additionally or alternatively be adjusted as part of the breach mitigation strategy.

Method 500 shows a more detail diagnostic routine. At 502, the method determines operating conditions. The operating conditions determined at step 502 may be similar to the operating conditions determined at step 402, in FIG. 4. As such, redundant description is omitted for brevity.

At 504, the method includes determining if the engine is operated in a boosted mode or an unboosted mode. Again, such a determination may take into account manifold pressure, compressor bypass valve position, wastegate valve position, and/or throttle position.

If it is determined that the engine is operating in an unboosted mode (NO at 504) the method moves to 506 where the method includes implementing an unboosted PCV diagnostic routine.

Conversely, if it is determined that the engine is operating in a boosted mode (YES at 504) the method proceeds to 508. At 508, the method includes sampling the pressure sensor. Next at 510, the method includes integrating the pressure sensor readings. Additionally, a crankcase pressure (e.g., expected crankcase pressure) may also be integrated at 510.

At 512, the method includes adjusting a pressure sensor sampling duration based on one or more parameters. The parameters may be barometric pressure and/or ambient temperature, in one example. In another example, a pressure (e.g., expected pressure) in the intake system upstream of the compressor may be used to determine the length of the pressure sensor sampling. In yet another example, a crankcase pressure (e.g., expected crankcase pressure) may be used to determine how long the pressure sensor is sampled for. In another example, manifold pressure (e.g., expected manifold pressure) may additionally or alternatively be used to determine the duration of pressure sensor sampling. It will be appreciated, that adjusting the pressure sensor sampling duration allows the routine to determine if there is enough pressure data to confidently diagnose the PCV system (e.g., the ventilation line).

At 513 the method includes determining if a threshold boost accumulation has been met. For instance, is may be determined if a boost pressure in the intake manifold has remained above a threshold value for a threshold time period. Furthermore, it will be understood that the pressure samples taken during boosted conditions may be gathered over multiple boost events and/or drive cycles, in some instances. If it is determined that the threshold boost accumulation has not been met (NO at 513) the method returns to 502. However, if it is determined that the threshold boost accumulation has been met (YES at 513) the method advances to 514. In this way, a desired amount of pressure data may be gathered to facilitate a confident PCV system diagnostic.

At 514, the method determines if the ventilation line is breached (e.g., a punctured line, a disconnected line, etc.) In one approach, a ventilation line breach may be determined using a calibrated fault threshold that may be a function of barometric pressure and/or ambient temperature, for example, compared against the integrated pressure sensor data. For example, if the integrated pressure sensor value is above the fault threshold it may be determined that the ventilation line is breached. However, other diagnostic calculations have been contemplated. For example, in another approach, an expected intake system vacuum (i.e., a pressure value in the intake system upstream of the compressor during boost condition) may be integrated and compared with the integrated pressure measured at the clean side of the oil separator. The expected intake system value may be kept at a negative value. As such, when compared against the integrated pressure value at the clean side of the oil separator a positive value may indicate the ventilation line is breached.

If it is determined that the ventilation line has not been breached (NO at 514) the method moves to 516 where the method includes maintaining current engine operating strategy. For example, the engine may sustain compressor boost that is adjusted based on torque demand.

However, if it is determined that the ventilation line has been breached (YES at 514) the method includes steps 518-522. At 518 the method includes setting a diagnostic code. For instance, the controller may set a diagnostic code corresponding to a ventilation line breach. At 520, the method includes notifying a vehicle operator of the ventilation line breach. For example, a warning light, display message, etc., may be provided to the driver indicating the ventilation line has been breached. Next at 522, the method includes implementing a mitigating action. For example, the amount of boost generated by the compressor may be decreased or compressor operation may be shut-down.

Turning to FIG. 6 shows pressure maps of pressure sampled or calculated during an exemplary PCV system diagnostic routine. As described herein exemplary indicates an optional feature and does not denote a preference for the feature. Plot 602 indicates engine speed. Plot 604 indicates a pressure gather from a pressure sensor on a clean side of the oil separator adjacent to the ventilation line. Plot 606 indicates crankcase pressure. Plot 608 indicates manifold air pressure. Plot 610 indicates integrated crankcase pressure. Plot 612 indicates integrated oil separator pressure sensor pressure. Additionally, for each plot in FIG. 6 as well as FIG. 7 time is indicated on the abscissa.

Threshold 611 indicates a level of integrated crankcase pressure at which the diagnostic routine is initiated. The threshold 611 may be used to allow the routine to gather enough data to make a confident diagnosis. As a result, the likelihood of a misdiagnosed ventilation line breach (e.g., puncture, rupture, detachment, etc.,) may be reduced. Threshold 613 indicates a breach fault threshold for the integrated pressure sensor pressure. Thus, when the integrated pressure sensor surpasses threshold 613 a ventilation line breach in the PCV system is indicated. Indication of the PCV line breach may include setting a diagnostic code and/or notifying a vehicle operator of the breach via a message, warning light, audio signal, etc. A mitigating action may also be implemented when a line breach is indicated such as adjusting boost pressure (e.g., decreasing boost pressure), adjusting fuel injection (e.g., increasing fuel injection), adjusting fuel injection timing, adjusting throttle, etc. It will be understood that the threshold 613 may be calculated when the integrated crankcase pressure exceeds threshold 611. Furthermore, the thresholds 611 and/or 613 may be a function of barometric pressure and/or ambient temperature, in one example. Further in another example, the diagnostic techniques may integrate the area under the pressure sensor curve when the crankcase and/or intake manifold pressure is expected to be positive. This accumulated pressure total will increase with increased amount of integration. Hence, the more opportunities to integrate the pressure sensor reading (e.g., total pressure sensor reading) the larger the separation between a faulted vs unfaulted system. As such, the more time spent in the boosted condition the more robust the diagnostic strategy may be. This means that a threshold amount of boosted time (e.g., positive intake manifold pressure) may be met before the diagnostic routine will evaluate the accumulated pressure sensor integration. The threshold amount of boost time may not be contiguous, in one example. For instance, the pressure may be sampled during non-sequential boost events. The diagnostic routine may accumulate the integrated pressure sensor measurements each time the vehicle meets the boosted conditions until the boost amount threshold is met. In one example, the threshold amount of boost desired on any given drive cycle may be chosen to meet at least the following two criteria: (1) The regulatory standards for In-Use Monitor Performance (IUMP) and (2) the ability to detect a faulted system (e.g. fault demonstration) on either a Federal Test Procedure (FTP) or a California Unified Drive cycles. However, the diagnostic technique may adhere to different regulatory standards. For low power-to-weight vehicles that are often boosted, this pressure sensor accumulation threshold can be set relatively large compared to a high power-to-weight vehicle that may not need as much boost on the regulatory drive cycles. One way to improve robustness on a high power-to-weight vehicle may be to maintain the pressure sensor accumulation across multiple drive cycles. However, other schemes for calculating the thresholds have been envisioned. Furthermore, the pressure sensor data may be checked to determine other faults in the PCV system. For example, an unsecured oil cap or oil dip stick may result in low crank case pressures and may also be detected as faults. Since the accumulated pressure sensor integration may be calculated solely during boosted conditions, in some instances, it may also be used to determine if the PCV valve is stuck open. A stuck open PCV valve during boost may result in very large crank case pressures as measured by this sensor. Hence a stuck open PCV valve may be detected by adding an additional threshold to be compared against the accumulated pressure integration measure, in one example.

Now turning to FIG. 7, another example crankcase system integrity breach diagnostic is depicted. Air intake system (AIS) pressure, upstream of the compressor, is indicated at 702. It will be understood that the arithmetic sign of the AIS pressure is retained. The AIS pressure may be an expected pressure drop from barometric pressure (BP) with increasing air flow that is modeled as a 2-dimensional polynomial in air flow and is based on other values such as ambient temperature, throttle position, compressor bypass valve position, etc. Additionally, the pressure at the pressure sensor on the clean side of the oil separator is indicated at 704. The integrated value of the pressure sensor pressure is indicated at 706 and the integrated value of the AIS pressure is indicated at 708. A threshold 709 for the integrated AIS pressure is also shown in FIG. 7. When the integrated AIS pressure falls below the threshold 709 sampling from the pressure sensor on the clean side of the oil separator may be discontinued. A fault threshold is indicated at 710 the fault threshold may indicate a threshold value for the integrated pressure sensor pressure. When the integrated pressure sensor pressure exceeds the fault threshold a ventilation line breach may be indicated. In one example, the pressure dip (i.e., the increasing vacuum show at 702) may be integrated and accumulated (e.g., accumulated over multiple boosted conditions and/or drive cycles), as indicated at 709, to determine that the vehicle has been operating in an increased air flow condition. Once the integrated and accumulated pressure sensor readings reaches a threshold (709) it may be ascertained that the diagnostic decision is robust for detecting faults when they occur and not detecting a fault when a fault does not exist. At this point the positive pressure measurement from the CKCP sensor (706) is compared to the threshold (710) to determine if a ventilation line (e.g., hose) fault exists. The ventilation line is assumed faulted when plot 706 is greater than plot 710. Otherwise, it is ascertained that the ventilation line is not faulted. Both threshold values (709 & 710) may vary with altitude (e.g., barometric pressure (BP)), ambient temperature, and/or engine air flow rate.

FIG. 8 shows another PCV system diagnostic method. At 802 the method includes determining operating conditions. The operating conditions may include manifold air pressure, intake system airflow, ambient temperature, ambient pressure, any of the operating conditions described above with regard to step 502, etc.

At 804 the method includes sampling the pressure sensor on the clean side of the oil separator. Next at 806 the method includes modeling the pressure on the clean side of the oil separator. The pressure on the clean side of the oil separator may be modeled, in one example, using the following technique and equations provided below. However, it will be understood that other suitable modeling strategies may be used, in other examples.

Initially, the air intake system (AIS) pressure is modeled as a second order polynomial in air flow.

$$AIS_{Pres} = C_2 * AM^2 + C_1 * AM + C_0 \quad (1)$$

where:
AM=air mass flow through the air intake system (AIS)
$C_x$=Coefficients of regression Next a crankcase pressure may be modeled using two components, the first component related to a cylinder blow-by value and the second component related to airflow into the crankcase through the PCV valve from the intake manifold.

$$CKC_{Pres} = CKC_{BlowBy} + CKC_{ManFlow} \quad (2)$$

$$CKC_{BlowBy} = C_5 AM^2 + C_4 * AM + C_3 \text{ (Regressed during boost with closed PCV valve)} \quad (3)$$

$$CKC_{ManFlow} = C_8 * (PCV_{Flow})^2 + C_7 * PCV_{Flow} + C_6 \quad (4)$$

where:
AM=air mass flow through the AIS
$C_x$=Coefficent of regression
$PCV_{Flow}$=Intake manifold pressure multiplied by a normalized PCV flow curve A regression between the abovementioned models and instrumentation sensors may be used to generate regression coefficients ($C_x$).

After the AIS and crankcase pressures are calculated, the expected pressure at the pressure sensor location is determined with a lumped capacitance model (e.g., forcing function and time constant based filter) with the following equation:

$$CKC_{ForceFunc} = Pres_{Weight} * [CKC_{Scale} * CKC_{Pres}] + (1 - Pres_{Weight}) * [AIS_{Scale} * AIS_{Pres}] \quad (5)$$

where:
$CKC_{Scale}$ & $AIS_{Scale}$=Scaling coefficients of regression
$Pres_{Weight}$=The proportion of the [current air flow relative to the minimum possible air flow] to the [full range of possible air flows]=$[AM-AM_{Min}]/[AM_{Max}-AM_{Min}]$ A time based first order low pass filter may be used to complete the lumped capacitance model, using the following equation.

$$CKC_{InfPres} = \text{FirstOrderFilter}(CKC_{InfPres}, CKC_{ForceFunc}, \text{Time}_{Const}) \quad (6)$$

where:

$\text{Time}_{const}$=time contant for lwo pass filter pressure rate of change

The inferred model may then be regressed against vehicle data containing the pressure sensor measurement to acquire the coefficients of regression to complete the model using the following equation.

$$\text{redisual sum of squares (RSS)} = \text{Sum}[CKCP_{Sensor} - CKC_{InfPres}]^2 \quad (7)$$

It will be understood that modeling the pressure as described above can lead to more accurate modeling when compared to other modeling techniques, thereby reducing the chance of downstream PCV system misdiagnoses. Plots associated with an example of the inferred crankcase pressure model at the pressure sensor on the clean side of the oil separator is illustrated in FIG. 9. Plot 900 indicates the modeled crankcase pressure and plot 902 indicates the pressure sampled from the pressure sensor on the clean side of the oil separator. Plot 904 indicates the modeling error. It will be understood that time is indicated on the abscissa in each graph in FIG. 9 as well as FIG. 10. Furthermore, in the graph containing plots 900 and 902, pressure is indicated on the ordinate. In the graph containing plot 904, modeling error is indicated on ordinate.

Returning to FIG. 8, next at 808 the method may include determining fault tolerances for the modeled pressure on the clean side of the oil separator. The fault tolerances indicate expected errors in the modeled pressure.

In one embodiment, the tolerance bands may be calculated using the set of equations provided below. However, other techniques for calculating tolerance bands have been contemplated. In such an embodiment, the tolerance band calculation is dependent on the direction of changing pressure (i.e., increasing or decreasing pressure). Specifically, in the equations below, a steady state error tolerance is used for both directions of pressure change while an additional multiplier on the tolerance is added in the direction of change of pressure. This results in protection against false fault diagnosis caused by transport delays between inferred and delivered air flow through the system and specifically caused by PCV valve flow and/or cylinder blow-by flow variability. Cylinder blow-by is defined herein as a gas flow from the combustion chamber to the crankcase around the pistons.

if $(CKCP_{Sensor} \geq P_{Exp}$ $T_{lo} = CKCP_{Sensor} - S_{err}$ $T_{hi} = CKCP_{Sensor} + (CKCP_{Sensor} - P_{Exp}) * P_{mult} + S_{err}$ Else $T_{lo} = CKCP_{Sensor} - S_{err}$ $T_{hi} = CKCP_{Sensor} + (CKCP_{Sensor} + P_{Exp}) * P_{mult} - S_{err}$ where:

$T_{lo}$=Low tolerance band $T_{hi}$=High tolerance band $S_{err}$=Steady state error $P_{mult}$=Pressure multiplier $CKCP_{Sensor}$=Measured pressure $P_{Exp}$=Expected pressure (filtered $CKC_{InfPres}$)

FIG. 10 shows a graph 1000 with a plot 1002 of the modeled pressure, pressure indicated on the ordinate and time indicated on the abscissa. Plot 1004 indicates a high tolerance band and plot 1006 indicates a low tolerance band. Thus, both positive and negative tolerance bands are provided to decrease diagnostic false positives. To elaborate, the error tolerance bands around the modeled pressure are determined and errors between the measured pressure and the tolerance bands are determined (e.g., inside for healing and outside for faulting). The tolerance bands may be designed to grow larger during engine transients and smaller during steady state engine operation, in one example. In this way, the diagnostic routine is protected from a false fault determination caused, for example, from smaller pressure monitoring errors during transient events while still allowing the diagnostic technique to determine larger sensor errors.

Returning to FIG. 8, the method 800 includes at 810 determining if a PCV system fault condition is occurring. Specifically, in one instance, the inferred crankcase pressure model at the pressure sensor along with the measured pressure from the pressure sensor on the clean side of the oil separator can be used to diagnose a fault condition, such as pressure sensor functionality and a PCV system breach condition. A ventilation line breach includes a condition where a puncture in the ventilation line is present, the ventilation line is disconnected, the line is improperly sealed at either end, etc. To elaborate the modeled and measured pressures may be used in a tolerance diagnostic test.

In one example, the diagnostic method may set a fault when an integration of the measured pressure error is not within a tolerance of the modeled pressure. The tolerance of the modeled pressure may be determined using the technique described above or other suitable tolerance band calculation techniques. This type of pass/fail decision may be determined a predetermined number of times per vehicle trip (e.g., once per vehicle trip) after a threshold amount of accumulated air mass flow in the intake system has been achieved. In this way, the confidence of the diagnostic routine can be increased.

In another diagnostic approach, the pressure from the pressure sensor on the clean side of the oil separator may be continuously measured and the modeled pressure may be continuously calculated. When the measured pressure is outside the fault tolerance bands the error is accumulated and when the measured pressure is inside the fault tolerance bands the error is subtracted. Again the tolerance bands may be calculated using the technique describe above or other suitable tolerance band calculation techniques. Subtraction of the error allows for healing in the diagnostic method, to reduce diagnostic errors. The amount of subtraction may be the linear distance between the measured pressure and the associated tolerance band. When the accumulated amount of errors surpasses a threshold a fault condition may be indicated.

If it is determined that a fault condition does not exist (NO at 810) the method moves to 812. At 812 the method includes maintaining the current engine operating strategy.

On the other hand, if it is determined that a fault condition is occurring (YES at 810) the method advances to 814 where the method includes implementing a fault condition mitigating action. For example, the amount of boost generated by a compressor may be reduced, engine speed may be reduced via throttle or fuel injector adjustment, etc. The mitigating action may be any action designed to reduce the impact of the fault condition on the PCV system.

Next at 816 the method includes setting a diagnostic code and/or notify the driver of the fault condition. For instance, a warning light, audio signal, graphic on an in-dash display, etc., may be used to alert the driver of the fault condition. In this way, the driver may be provided with a greater amount of vehicle information, thereby encouraging the driver to take steps to correct the issue such as servicing the vehicle.

The technical effect of providing a diagnostic routine using a pressure sensor reading on a clean side of an oil separator is to expand the range over which PCV system diagnostics can be implemented as well as increase the confidence in a PCV system breach diagnosis. As a result, the likelihood of undiagnosed faults is decreased and the likelihood of false positives in PCV diagnostics is correspondingly diminished.

The invention will be further described in the following paragraphs. In one aspect, a method is provided that comprises: when an intake manifold air pressure is above a threshold boost value, determining a PCV system breach based on a pressure determined using a pressure sensor positioned on a clean side of an oil separator coupled to a crankcase and receiving crankcase gas from the crankcase, where a ventilation line provides fluidic communication between the oil separator and an intake conduit upstream of a compressor.

In one example, the method may further comprise responsive to determining the PCV system breach, implementing a mitigating action, where the mitigating action includes adjusting boost generated by the compressor. In another example, the method may further include responsive to determining the PCV system breach, setting a diagnostic code indicating PCV system breach; and/or notifying a vehicle operator of the PCV system breach.

In another aspect, a PCV system is provided that comprises: a crankcase including an interior chamber; an oil separator coupled to the crankcase; a PCV valve positioned in a PCV line coupled to the crankcase and an intake manifold downstream of a compressor; a ventilation line coupled to the oil separator and an intake conduit located upstream of the compressor; a pressure sensor positioned on a clean side of an oil separator and spaced away from an end of the ventilation line, the oil separator coupled to the crankcase; and a controller including instructions stored in non-transitory memory that when executed cause the controller to: while the PCV system is operated with a boosted engine condition where an intake manifold air pressure is above a threshold value and where a PCV valve in a PCV line coupled to a crankcase and an intake manifold downstream of a compressor meters gas flow to the crankcase, determine a PCV system breach based on a pressure determined using the pressure sensor.

In another aspect, a diagnostic method for a PCV system is provided that comprises: operating the PCV system with a boosted engine condition where an intake manifold air pressure is above a threshold value and where a PCV valve in a PCV line coupled to a crankcase and an intake manifold downstream of a compressor meters gas flow to the crankcase; and while the PCV system is operated with the boosted engine condition, determining a PCV system breach based on a pressure measured using a pressure sensor arranged on a clean side of an oil separator coupled to the crankcase, where the sensor spaced away from an end of a ventilation line coupled to the oil separator and an intake conduit upstream of the compressor; and responsive to determining the PCV system breach, setting a diagnostic code indicating PCV system breach, notifying a vehicle operator of the PCV system breach, and/or implementing a mitigating action.

In another aspect, a method is provided that comprises: determining a fault condition in a PCV system by comparing a pressure sampled from a pressure sensor positioned on a clean side of an oil separator coupled to a crankcase with a modeled pressure representing an expected pressure on the clean side of the oil separator. In one example, the method may further comprise implementing a mitigating action in the PCV system in response to determining the fault condition. In another example, the method may further comprise setting a diagnostic code, and/or notifying a vehicle operator of the fault condition in response to determining the fault condition.

In yet another aspect, a PCV system in an engine is provided that comprises: a crankcase including an interior chamber; an oil separator coupled to the crankcase; a PCV valve positioned in a PCV line coupled to the crankcase and an intake manifold in an intake system; a pressure sensor positioned on a clean side of the oil separator and spaced away from an end of a ventilation line, where the oil separator is coupled to the crankcase; and a controller including instructions stored in non-transitory memory that when executed cause the controller to: determine a fault condition in the PCV system by comparing a pressure sampled from the pressure sensor with a modeled pressure representing an expected pressure on the clean side of the oil separator.

In another aspect, a method for operating a PCV system in an engine is provided that comprises: sampling a pressure sensor positioned on a clean side of an oil separator coupled to a crankcase to determine a measured pressure; generating a modeled pressure representing an expected pressure on the clean side of the oil separator; comparing the measured pressure with the modeled pressure; and determining a fault condition based on the comparison between the measured pressure and the modeled pressure.

In any of the aspects or combinations of the aspects, determining the PCV system breach may include determining the ventilation line is leaking and/or disconnected from the oil separator and/or the intake conduit.

In any of the aspects or combinations of the aspects, determining the PCV system breach may include determining if the pressure of the pressure sensor is greater than a fault threshold and where the fault threshold is a determined based on barometric pressure in the intake manifold and/or ambient temperature.

In any of the aspects or combinations of the aspects, determining the PCV system breach may include sampling the pressure sensor.

In any of the aspects or combinations of the aspects, a length of the sampling of the pressure sensor may be determined based on a crankcase pressure and/or a pressure in the intake manifold.

In any of the aspects or combinations of the aspects, a length of the sampling of the pressure sensor may be determined based a pressure in the intake conduit upstream of the compressor.

In any of the aspects or combinations of the aspects, the PCV valve may be a passive bi-directional valve including a metering orifice.

In any of the aspects or combinations of the aspects, the metering orifice may be in parallel fluidic communication with a check valve.

In any of the aspects or combinations of the aspects, the oil separator and the pressure sensor may be located in a cam cover.

In any of the aspects or combinations of the aspects, determining the PCV system breach may include determining the ventilation line is disconnected from the oil separator and/or the intake conduit and where determining the PCV system breach includes determining if the pressure determined using the pressure sensor is greater than a fault threshold and where the fault threshold is determined based on barometric pressure and/or ambient temperature.

In any of the aspects or combinations of the aspects, determining the PCV system breach may include sampling the pressure sensor and where a length of the sampling of the pressure sensor may be determined based on: a crankcase pressure and/or a pressure in the intake manifold; or a pressure in the intake conduit upstream of the compressor.

In any of the aspects or combinations of the aspects, the controller may include instructions stored in the non-transitory memory that when executed cause the controller to sample the pressure sensor during a time period including multiple boost events and/or drive cycles.

In any of the aspects or combinations of the aspects, the controller may include instructions stored in the non-transitory memory that when executed cause the controller to: implement a mitigating action in response to determining the PCV system breach, where the mitigating action includes adjusting boost generated by the compressor.

In any of the aspects or combinations of the aspects, determining the PCV system breach may include sampling the pressure sensor and where a length of the sampling of the pressure sensor may be determined based on: a crankcase pressure and/or a pressure in the intake manifold; or a pressure in the intake conduit upstream of the compressor.

In any of the aspects or combinations of the aspects, the mitigating action may include adjusting boost generated by the compressor.

In any of the aspects or combinations of the aspects, the PCV valve may be a passive bi-directional valve including a metering orifice and where the pressure sensor and the oil separator are positioned in a cam cover.

In any of the aspects or combinations of the aspects, the fault condition may be a PCV ventilation line leak.

In any of the aspects or combinations of the aspects, the fault condition may be a malfunction of the pressure sensor.

In any of the aspects or combinations of the aspects, determining the fault condition may include determining if the comparison between the sampled pressure and the modeled pressure is outside a dynamic tolerance band.

In any of the aspects or combinations of the aspects, modeled pressure may be determined based on a cylinder blow-by value and an airflow through a PCV valve into the crankcase from an intake manifold.

In any of the aspects or combinations of the aspects, the ventilation line may be coupled to the oil separator and an intake conduit arranged upstream of a compressor and where the intake manifold is arranged downstream of the compressor.

In any of the aspects or combinations of the aspects, the fault condition may be a ventilation line leak and/or a pressure sensor malfunction.

In any of the aspects or combinations of the aspects, determining the fault condition may include determining if the comparison between the sampled pressure and the modeled pressure is outside a tolerance band.

In any of the aspects or combinations of the aspects, the tolerance band may be dynamic and increases during engine transients and decrease during steady state conditions of the engine.

In any of the aspects or combinations of the aspects, the modeled pressure may be determined based on a cylinder blow-by value and an airflow through a PCV valve into the crankcase from the intake manifold.

In any of the aspects or combinations of the aspects, the fault condition may be determined responsive to an accumulated air flow through the intake system surpassing a threshold value.

In any of the aspects or combinations of the aspects, the fault condition may be determined responsive to the intake manifold pressure surpassing a threshold value indicating a boost condition.

In any of the aspects or combinations of the aspects, the fault condition may be a ventilation line leak and/or a pressure sensor malfunction.

In any of the aspects or combinations of the aspects, the modeled pressure may be determined based on a cylinder blow-by value and an airflow through a PCV valve into the crankcase from an intake manifold.

In any of the aspects or combinations of the aspects, determining the fault condition may include determining if the comparison between the sampled pressure and the modeled pressure is outside a tolerance band.

In any of the aspects or combinations of the aspects, the tolerance band may be dynamic and increases during engine transients and decrease during steady state conditions of the engine.

In another representation, a diagnostic method for a ventilation line in a PCV system is provided that comprises sampling a pressure on a clean side of an oil separator only when the engine is operating with a manifold pressure above barometric pressure and indicating a ventilation line breach based on the pressure at the pressure sensor.

In yet another representation, a PCV system diagnostic method is provided that comprises predicting a pressure on a clean side of an oil separator and determining a fault condition when a pressure sampled from a pressure sensor on the clean side of the oil separator is outside a tolerance band corresponding to the predicted pressure.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
determining a fault condition in a positive crankcase ventilation (PCV) system by comparing a pressure sampled from a pressure sensor positioned on a clean side of an oil separator coupled to a crankcase with a modeled pressure representing an expected pressure on the clean side of the oil separator, where the clean side of the oil separator is coupled to an intake conduit of an engine upstream of an intake throttle via a ventilation line.

2. The method of claim 1, where the fault condition is a PCV ventilation line leak.

3. The method of claim 1, where the fault condition is a malfunction of the pressure sensor.

4. The method of claim 1, where determining the fault condition includes determining if the comparison between the sampled pressure and the modeled pressure is outside a dynamic tolerance band.

5. The method of claim 1, where the modeled pressure is determined based on a cylinder blow-by value and an airflow through a PCV valve into the crankcase from an intake manifold.

6. The method of claim 1, further comprising implementing a mitigating action in the PCV system in response to determining the fault condition.

7. The method of claim 1, further comprising setting a diagnostic code, and/or notifying a vehicle operator of the fault condition in response to determining the fault condition.

8. A positive crankcase ventilation (PCV) system in an engine comprising:
   a crankcase including an interior chamber;
   an oil separator coupled to the crankcase;
   a PCV valve positioned in a PCV line coupled to the crankcase and an intake manifold in an intake system;
   a pressure sensor positioned on a clean side of the oil separator and spaced away from an end of a ventilation line, where the oil separator is coupled to the crankcase; and
   a controller including instructions stored in non-transitory memory that when executed cause the controller to:
      determine a fault condition in the PCV system by comparing a pressure sampled from the pressure sensor with a modeled pressure representing an expected pressure on the clean side of the oil separator.

9. The PCV system of claim 8, where the ventilation line is coupled to the oil separator and an intake conduit arranged upstream of a compressor and where the intake manifold is arranged downstream of the compressor.

10. The PCV system of claim 9, where the fault condition is a ventilation line leak and/or a pressure sensor malfunction.

11. The PCV system of claim 9, where determining the fault condition includes determining if the comparison between the sampled pressure and the modeled pressure is outside a tolerance band.

12. The PCV system of claim 11, where the tolerance band is dynamic and increases during engine transients and decrease during steady state conditions of the engine.

13. The PCV system of claim 9, where the modeled pressure is determined based on a cylinder blow-by value and an airflow through a PCV valve into the crankcase from the intake manifold.

14. The PCV system of claim 9, where the fault condition is determined responsive to an accumulated air flow through the intake system surpassing a threshold value.

15. The PCV system of claim 9, where the fault condition is determined responsive to the intake manifold pressure surpassing a threshold value indicating a boost condition.

16. A method for operating a positive crankcase ventilation (PCV) system in an engine comprising:
   sampling a pressure sensor positioned on a clean side of an oil separator coupled to a crankcase to determine a measured pressure, the oil separator coupled to an intake passage of the engine via a ventilation line;
   generating a modeled pressure representing an expected pressure on the clean side of the oil separator;
   comparing the measured pressure with the modeled pressure; and
   determining a fault condition based on the comparison between the measured pressure and the modeled pressure.

17. The method of claim 16, where the fault condition is a ventilation line leak and/or a pressure sensor malfunction.

18. The method of claim 16, where the modeled pressure is determined based on a cylinder blow-by value and an airflow through a PCV valve into the crankcase from an intake manifold.

19. The method of claim 16, where determining the fault condition includes determining if the comparison between the sampled pressure and the modeled pressure is outside a tolerance band.

20. The method of claim 19, where the tolerance band is dynamic and increases during engine transients and decrease during steady state conditions of the engine.

\* \* \* \* \*